United States Patent [19]

Kummer et al.

[11] Patent Number: 4,497,354
[45] Date of Patent: Feb. 5, 1985

[54] LOW NOISE PLANING MACHINE, PARTICULARLY HAND PLANER

[75] Inventors: Martin Kummer, Filderstadt; Uwe Krieg, Leinfelden-Echterdingen; Wolfgang Jundt, Ditzingen; Werner Rieker, Steinenbronn; Fritz Schädlich, Leinfelden-Echterdingen; Günter Schaal, Stuttgart, all of Fed. Rep. of Germany

[73] Assignee: Robert Bosch GmbH, Stuttgart, Fed. Rep. of Germany

[21] Appl. No.: 617,842

[22] Filed: Jun. 6, 1984

Related U.S. Application Data

[63] Continuation of Ser. No. 419,878, Sep. 20, 1982, abandoned, which is a continuation of Ser. No. 168,633, Jul. 11, 1980, abandoned.

[30] Foreign Application Priority Data

Sep. 29, 1979 [DE] Fed. Rep. of Germany ....... 2939598

[51] Int. Cl.³ ............................................... B27C 1/10
[52] U.S. Cl. ...................................................... 145/4
[58] Field of Search .......................... 145/4.1, 4.0, 4.2

[56] References Cited

U.S. PATENT DOCUMENTS

| 795,997 | 8/1905 | Mathews | 145/4 |
| 982,759 | 1/1911 | Bagalio | 145/4.1 |
| 1,418,328 | 6/1922 | Power | 145/4 |
| 2,649,873 | 8/1953 | Reich et al. | 145/4 |
| 4,066,111 | 1/1978 | Klebe | 145/4 |

FOREIGN PATENT DOCUMENTS 2141584  3/1973  Fed. Rep. of Germany .......... 145/4

Primary Examiner—James G. Smith
Assistant Examiner—J. T. Zatarga
Attorney, Agent, or Firm—Frishauf, Holtz, Goodman & Woodward

[57] ABSTRACT

To reduce operating noise, and particularly the impact of sound pressure waves on the internal structure of the planing machine, the edges defining separating walls against which sound waves may impinge are inclined with respect to the axis of rotation of the cutter (16) or a theoretical line (46) parallel thereto, thereby extending the time of impact of individual pressure waves emanating from the cutter of incremental surface areas of the respective edges (26, 48, 50; 42, 52, 54; 30) to simultaneously attenuate the impact of the pressure waves and the timing of the impact.

13 Claims, 3 Drawing Figures

LOW NOISE PLANING MACHINE, PARTICULARLY HAND PLANER

This application is a continuation of application Ser. No. 419,828, filed Sept. 20, 1982 which is a continuation of Ser. No. 168,633 filed July 11, 1980, both abandoned.

The present invention relates to a planing machine, and more particularly to a hand-held planer, in which a rotary planing cutter is driven by an electric motor to rotate within a working or operating chamber and remove materials from the surface of a workpiece.

BACKGROUND AND PRIOR ART

Customary planing machines, and particularly hand-held planers, use rotary cutters in which cutter blades are located on a cylindrical cutting element which is driven by an electric motor to rotate in a direction essentially transverse to the longitudinal extent of the machine. The cutter is operative within an operating or working chamber which is open at the planing surface to project slightly from the planing surface and thereby effect workpiece removal upon rotation. The opening at the planing surface is wider than the cutter to permit removal of workpiece material in chip form through a portion of the housing for ejection therefrom, usually in a lateral direction. The cutting edges of the planer, as they rotate, cause recurrent pressure wave to occur which arise at the edges of the respective housing portions defining the operating chamber. Since the cutter operates at high speed, the sharp, pulse-like pressure waves cause substantial operating noise which is highly disagreeable to the user and causes, overall, ambient noise pollution.

THE INVENTION

It is an object to provide a planing machine which has the operating efficiency and effectiveness of known planers but a substantially reduced operating noise level, and which is so constructed that it is not heavier than known planers and can be easily and simply made.

Briefly, at least one of the housing portions which define respective inlet, operating or chip transporting, and outlet portions of the operating chamber have edge zones terminating in edge or terminal lines which are inclined with respect to theoretical line parallel to the axis of rotation of the chip cutter and located in a plane parallel to a plane which is tangential to the chip cutter. In accordance with a preferred form, the inclination may extend in two directions, so that the edges present a roof-shaped, or shallow "V" appearance, diverging from a central apex.

Inclination of the edge of a wall portion defining the chamber has the result that incremental areas or portions o zones of the cutter blade on the cutter sequentially pass the edge of the wall portion, rather than at the same time as in an axially parallel edge of the wall portion.

The arrangement has the advantage that pressure waves which occur adjacent the rotary path of the cutting edges of the cutter are extended in time with respect to the impingement portion on the housing wall, so that impingement of the pressure waves on the housing wall is attenuated, thus preventing transfer of high-intensity pressure waves to the housing itself. The operating noise is substantially reduced. This is achieved without the addition of noise damping material, and only by shaping the respective walls defining the operating chambers or, rather, those portions which are subject to being impinged by pulse-type pressure waves. The weight of the machine and its handling characteristics are not changed.

In planing machines which have a common separating wall which separates both the chip removal duct and the cylindrical operating space of the rotary cutter from the remainder of the housing, it is particularly desirable to then form the end portion of this common separating wall in inclined direction with respect to the axis of rotation of the chip cutter, and especially in doubly-inclined direction, starting from a preferably central apex point. Other edge portions adjacent the working chamber within which the cutter operates likewise may be inclined. In a particularly preferred form, the forward edge of the cutting depth defining wedge and immediately adjacent the operating chamber is also formed with an inclined surface.

Forming the inclined surfaces in double-wedge form assists in ejecting chips from both sides of the housing, uniformly and without pile-up of chips within the operating chamber adjacent the ejection ports from the housing.

DRAWING

Figure 1:
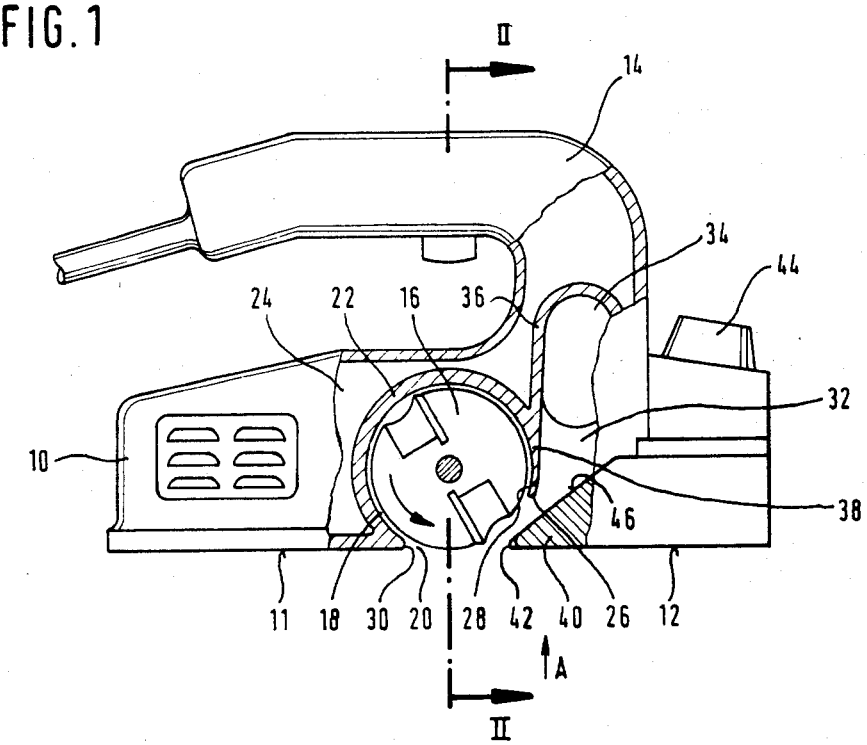
FIG. 1 is a side view, partly in section, of a hand planer, and showing only those portions of the planer material to an understanding of the present invention.

The planing machine has a housing 10, consisting of two longitudinal half shells, and defining plane flat bottom planing surfaces 11, 12, and further providing a unitary handle 14. Housing 10 retains an electric motor (not shown specifically and not visible in the figures) and drive gearing, as well known. The motor drives a cutter cylinder 16 which has axially extending, radially projecting cutter blades thereon. Cutter cylinder 16 is rotatably journaled in a cylindrical operating or working chamber 18 formed in housing 10. The cylindrical chamber 18 forms part of an internal chamber arrangement having various portions. Chamber 18 is open to the planing surface and forms an inlet portion 20. The chamber 18 is defined in part by an intermediate wall 22 to separate the chamber from the remaining inner space or chamber portion 24 of the housing 10. The subdividing wall 22 partly surrounds the cutter cylinder 16, and defines an edge 26 which starts adjacent the chip removal opening 28 of the working chamber 18 located in a plane parallel to a plane tangential to the cutter cylinder. The working chamber 18 then includes a chip removal duct portion 32 which terminates in lateral chip ejection openings 34 formed in the housing 10. The chip removal duct 32 is separated from the remainder of the interior space of the housing 10 by an intermediate wall 36. Wall 36 merges, in its lower portion, with wall 22 and thus has a common lower edge 26 therewith.

A planing depth control shoe 40, of wedge shape, is provided, tapering to an edge 42 which defines one end of the opening portion 28 of the operating chamber 18. The position of the shoe 40 with respect to the remainder of the machine can be adjusted by an adjustment screw 44 which determines the cutting depth of the machine. The wedge surface 46 (FIG. 1) of shoe 40 extends tangentially from the working chamber 18 and leads into the chip removal duct 32.

Figure 2:
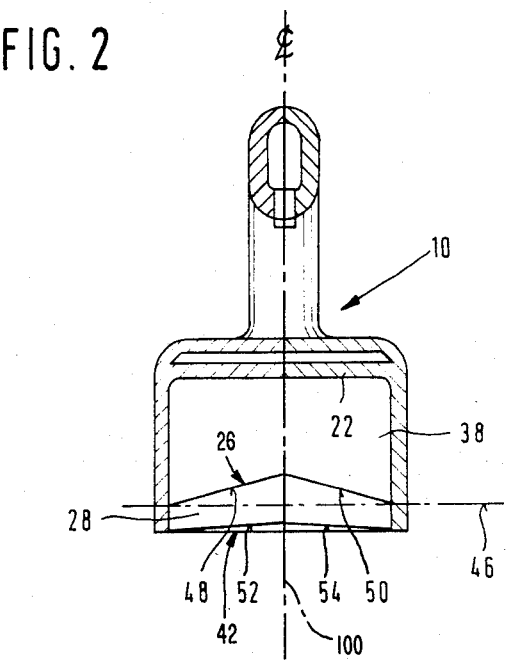
FIG. 2 is a section along line II—II of FIG. 1.
Figure 3:
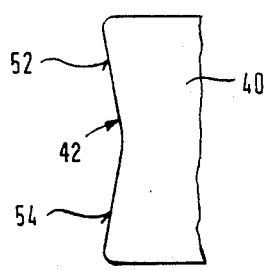
FIG. 3 is a fragmentary bottom view, in the direction of arrow A of FIG. 1.

In accordance with the invention, and in order to reduce noise level in operation, the edge 26 of the end portion or edge zone of the separating wall 22, is defined by a terminal line which is inclined with respect to the axis of rotation of the cutter 16 or, rather, with respect to a theoretical line parallel thereto, as seen in FIG. 2. The edge 26 has an edge portion 48 extending at a positive angle with respect to line 46 to a central apex at center line 100, and then an edge portion 50 extending from the apex at center line 100 at a negative angle with an edge portion 50 with respect to line 46, to the other end of the housing. Thus, the edge 26 is roof shaped. The portions 48, 50 form an obtuse angle. Similarly, the edge 42 of shoe 40 also is roof shaped with edge portions 52, 54 (FIGS. 2 and 3). Forming the edges 26, 42 inclined, with respect to the axis of rotation of cutter 16, provides for impingement of pressure waves which cause noise at different times with respect to different incremental portions or zones of the respective edges of the outer blades, so that the intensity of generated noise is attenuated and, additionally, spread in time. Inclining these edges thus results in substantial decrease in the operating noise of the machine. Arranging the inclination to be peaked at the center, or roof shape results, additionally, in uniform distribution of the chips to oppositely located chip removal openings 34 formed in the housing 10.

In some machines it is sufficient to form only one of these edges in inclined form and, in the preferred form, the edge 26 of the common portion 38 of inner walls 22 and 36 is so shaped. In some tools it may additionally be desirable to form the edge 30 opposite edge 42 also at an inclination with respect to the axis of rotation, and preferably in roof shape form.

The angles of inclination are not critical, and may extend from between 10° to about 30° with respect to the theoretical line 46. As shown in FIG. 2, the edge 26 is inclined at an angle of about 17°; as shown in FIG. 3, the edge 42 is inclined at an angle of about 12° with respect to line 46, so that the included angle between surfaces 52, 54 (FIG. 3) will be about 156°.

Various changes and modifications may be made, and features described in connection with any one of the embodiments may be used with any of the others, within the scope of the inventive concept.

The edges which are inclined with respect to the axis of rotation of the rotary cutter 16 can be machined simply and easily, and no specific change in the overall design of the planing machine is necessary. The shapes shown in FIGS. 2 and 3 are particularly easy to produce. Of course, continuously curved edges, such as segments of circular openings, or the like, may also be used in which the reference to "angles of inclination" is deemed to tangential portions thereof.

We claim:

1. Planing machine having a housing including a first portion defining a planing surface and a second portion defining an operating chamber (18);

an essentially cylindrical, rotary cutter (16) mounted in the housing and rotatable in the operating chamber about an axis of rotation, the cutter having a body portion and at least one axially extending and radially projecting cutter blade;

said operating chamber (18) having an inlet portion (28) adjacent a rotary cutter and open to the planing surface of the machine, an inner portion (32) and an outlet (34) from the inner portion passing through the housing to permit removal of chips from the operating chamber (18), said housing including an inner separating wall (36) forming, at least in part, a wall of said operating chamber and separating said inner portion of the chamber from the cutter, wherein the separating wall terminates in an edge (26), which edge is positioned adjacent the rotary cutter and is located in a plane parallel to a plane tangent to the essentially cylindrical rotary cutter; and wherein the edge (26) extends at least in part in a direction which is inclined at an angle less than 90 degrees with respect to a line parallel to the axis of rotation of the rotary cutter (16) to provide for sequential passage of elementary zones or portions of the cutter blade past said edge and prevent formation of noise generating pressure waves.

2. Machine according to claim 1, wherein the housing includes a wall (22) which is at least part-cylindrical and surrounds the rotary cutter, said at least part-cylindrical wall and said separating wall (36) merging into a common wall portion (38) having said edge (26) adjacent the rotary cutter which is inclined with respect to the axis of rotation of the rotary cutter.

3. Machine according to claim 1 wherein the housing portion ahead of the cutter (16)—in the direction of rotation of the rotary cutter—is formed with a slider shoe (40) having a shoe edge (42) which is located in a plane parallel to a plane tangent to the cylindrical cutter;

and wherein the shoe edge extends at least in part in a direction which is inclined at an angle less than 90 degrees with repect to a line parallel to the axis of rotation of the rotary cutter.

4. Machine according to claim 2 wherein the housing portion ahead of the cutter (16)—in the direction of rotation of the rotary cutter—is formed with a slider shoe (40) having a shoe edge (42) which is located in a plane parallel to a plan tangent to the cylindrical cutter;

and wherein the shoe edge extends at least in part in a direction which is inclined at an angle less than 90 degrees with respect to a line parallel to the axis of rotation of the rotary cutter.

5. Machine according to claim 3 wherein the slider shoe (40) is height adjustable and forms a portion of the housing, and is adjustable with respect to the remainder of the housing.

6. Machine according to claim 4 wherein the slider shoe (40) is height adjustable and forms a portion of the housing, and is adjustable with respect to the remainder of the housing.

7. Planing machine having a housing including a first portion defining a planing surface and a second portion defining an operating chamber (18);

an essentially cylindrical, rotary cutter (16) mounted in the housing and rotatable in the operating chamber about an axis of rotation, the cutter having a body portion and at least one axially extending and radially projecting cutter blade;

said operating chamber (18) having an inlet portion (28) adjacent a rotary cutter and open to the planing surface of the machine, an inner portion (32) and an outlet (34) from the inner portion passing through the housing to permit removal of chips from the operating chamber (18), said housing including an inner separating wall (36) forming, at least in part, a wall of said operating chamber and separating said inner portion of the chamber from the cutter, wherein the separating wall terminates in an edge (26), which edge is positioned adjacent the rotary cutter and is located in a plane parallel to a plane tangent to the essentially cylindrical rotary cutter; and wherein said edge comprises two edge portions connected to form a shallow "V" and having positive and negative angles of inclination less than 90 degrees with respect to a line parallel to the axis of rotation of the essentially cylindrical cutter to provide for sequential passage of elementary zones or portions of the cutter blade past said portions and prevent formation of noise generating pressure waves.

8. Machine according to claim 7 wherein the housing portion ahead of the cutter (16)—in the direction of rotation of the rotary cutter—and defining the planing surface is formed with a support slider shoe (40) having a shoe edge (42) which is located in a plane parallel to the plane tangent to the cylindrical cutter;

and wherein the shoe edge comprises two edge portions connected to form a shallow V and having positive and negative angles of inclination less than 90 degrees with respect to said line parallel to the axis of rotation of the essentially cylindrical cutter.

9. Machine according to claim 8 wherein the slide shoe (40) is height adjustable and forms a portion of the housing, and is adjustable with respect to the remainder of the housing.

10. Planing machine having a housing (10) including a first portion defining a planing surface and a second portion defining an operating chamber (18);

an essentially cylindrical, rotary cutter (16) mounted in the housing and rotatable within the operating chamber about an axis of rotation, the cutter having a body portion and at least one axially extending and radially projecting cutter blade;

said operating chamber having an inlet portion (28) adjacent the rotary cutter and open to the planing surface of the machine, an inner portion (32)

and an outlet (23) from the inner portion passing through the housing to permit removal of chips from the operating chamber;

and wherein the housing portion ahead of the cutter (16)—in the direction of rotation of the rotary cutter—and defining the planing surface is formed with a slider shoe (40) terminating in an edge (42) which is positioned adjacent the rotary cutter and located in a plane parallel to a plane tangent to the essentially cylindrical rotary cutter;

and wherein the shoe edge extends, at least in part, in a direction which is inclined at an angle less than 90° with respect to a line parallel to the axis of rotation of the rotary cutter to provide for sequential passage of elementary zones or portions of the cutter blade past said edge and prevent formation of noise generating pressure waves.

11. Planing machine according to claim 10 wherein the edge which extends at least in part in a direction inclined with respect to the axis of rotation comprises two edge portions connected to form a shallow V and having positive and negative angles of inclination less than 90 degrees with respect to said line parallel to the axis of rotation.

12. Planing machine according to claim 10 wherein the slider shoe (40) is height adjustable and forms a portion of the housing, and is adjustable with respect to the remainder of the housing.

13. Planing machine according to claim 11 wherein the slider shoe (40) is height adjustable and forms a portion of the housing, and is adjustable with respect to the remainder of the housing.

* * * * *